July 18, 1950        T. W. F. WALDEN        2,515,680
ADJUSTABLE LEVEL
Filed Sept. 26, 1946
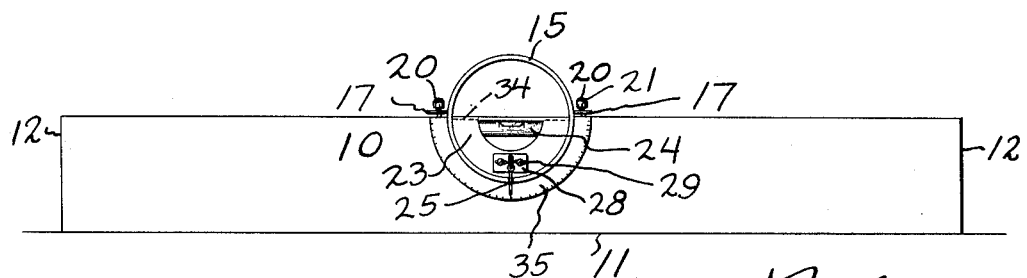
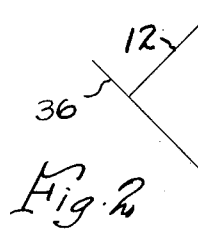
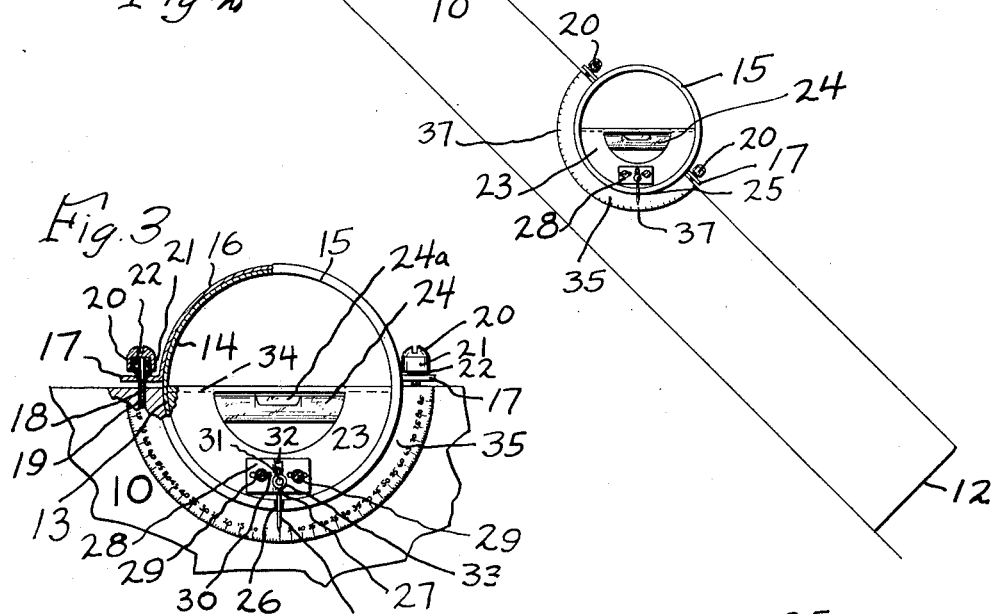
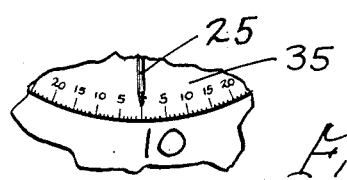
INVENTOR
Theo W. F. Walden
BY Sam J. Slotsky
ATTORNEY Patented July 18, 1950

2,515,680

UNITED STATES PATENT OFFICE 2,515,680

ADJUSTABLE LEVEL

Theo W. F. Walden, Cherokee, Iowa

Application September 26, 1946, Serial No. 699,537

1 Claim. (Cl. 33—213)

My invention pertains to a leveling device.

An object of my invention is to provide a leveling arrangement for use by carpenters, bricklayers, masonry workmen and other artisans which can be set to a predetermined angle and which will correspondingly indicate to the workmen that the structure is at the proper angle when the device is applied thereagainst.

A further object of my invention is to provide a tensioned arrangement wherein the leveling tube is maintained in its correct position at the desired angle.

A further object of my invention is to provide means for adjustably securing the indicator needle on the device, with further means for retracting the needle when desired.

A further object of my invention is to provide convenient means for manipulating the level arrangement, and to provide a structure which is of simple manufacture.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a side elevation of the adjustable level as applied to a flat surface, Figure 2 is a side elevation of the device as applied to a 45° surface, Figure 3 is an enlarged detail with a portion thereof showing a fragmentary section, Figure 4 is a side view of Figure 3, and Figure 5 is a detail.

My invention contemplates the provision of a leveling device which includes means for adjustably securing a rotatable leveling arrangement in any desired angle ranging from a flat surface of 180° and up to and including 90° from the horizontal, or in other words up to and including a true vertical position.

I have used the character 10 to designate a block of hard wood or other material of substantial length, width and thickness, the lower surface 11 of which is perfectly flat and including end surfaces at 12 which are perfectly flat and directly at right angles to the surface 11. Formed at the mid-point of the member 10 is a semi-circular cavity 13 which receives the ring member 14 which ring member includes the raised beads 15, and snugly engaging the upper half of the ring member 14 is a retaining semi-circular member 16 which terminates in the outwardly extending flanges 17 through which flanges are received the threaded screws 18, which are threadably engaged at 19 (see Figure 3) with the member 10. The screws 18 terminate in the slotted heads 20 which heads merge into the integral annular cylindrical side portions 21. Positioned between the head 20 and the flange 17 and receiving the screws 18 are the compression springs 22 which are adapted to thereby bear against the flanges 17. Securely attached to the ring 14 is an inner solid semi-ring portion 23 to which is secured the glass level tube 24 which includes the bubble 24a therein, such bubble being formed in the liquid in the tube 24. The tube 24 is positioned in a firm manner and so it is always directly at right angles to the indicating needle 25 which needle 25 is received within a suitable groove at 26 formed in the bead 15. The needle 25 is received within a humped portion at 27 which is formed in the plate 28 and the plate 28 is attached to the member 23 by means of the screws 29 which are received within the longitudinal slots 30. Attached to the needle 25 is a small threaded stud 31 which is received within the vertical slot 32 and which is locked by means of the small knurled nut 33. A flange 34 extends outwardly from the other side of the member 23 and is adapted to be used for rotating the member 23 as well as the ring 14. Attached adjacently to the ring 14 is the semi-circular indicating scale 35 which is graduated to degrees from 0° to 90° as shown in Figure 5 or in any other similar arrangement.

Now that the structure of my device has been explained, I will explain the operation thereof.

In the event it is desired to position structures at a certain angle, or to determine if such structures are at the correct angle, by grasping the handle flange 34, the entire ring 14 can be rotated to the desired angle which angle will register with the pointed end of the indicator needle 25. For instance, as shown in Figure 2 the slope of the surface 36 can be assumed to be 45° with the arrangement set with the needle registering with the 45° mark as indicated by the character 37, and with slopes on the other side of the vertical line being determined by swinging the arrangement to the other 45° marking as shown. In this way any angle can be set as predetermined.

In the event it is desired to align a vertical surface, and thence a horizontal surface the end surface such as 12 can be used which is placed on the horizontal surface when the leveling tube 24 is transverse to the lower face 11. In this manner the leveling device will register a vertical surface or a horizontal surface without adjustment.

It will also be noted that the spring tension of the spring 22 will maintain the upper semicircular ring 16 snugly against the rotatable portion of the device to maintain a firmly fixed position to the arrangement. In many cases it is desirable to retract the needle 25 so that it is drawn back within the protecting bead 15 which is effected by loosening the screw 33 and by forcing the needle upwardly due to the attachment of the stud 31 with the needle which stud will slide through the slot 32.

In the event it is desired to true up the arrangement for any reason, the screws 29 can be loosened and the plate 28 can be positioned at one side or other due to the slots 30, the arrangement then being retightened.

It will now be seen that I have provided the various advantages set forth in the objects of my invention with other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

An adjustable level comprising a leveling block, a rotatable level indicating member secured within said block, said rotatable member including an indicating needle, a level bubble tube secured therein, an angle indicating scale registering with said needle, means for exerting spring tension against said rotatable member for retaining the same in desired position, including a semi-circular band snugly engaging the upper portion of said rotatable member including flanges, screws received through said flanges, and attached to said leveling block adjacent said angle indicating scale, springs receiving said screws positioned between the screw heads and the flanges for maintaining said spring tension, means for retracting said needle away from said angle indicating scale, including a plate member attached to said rotatable member, said plate member having a slot aligned with said needle, means attached to said needle and received within said slot to provide retractable movement of said needle, means for locking the needle in either outer or retracted position.

THEO W. F. WALDEN.

REFERENCES CITED

The following references are of record in the file of this patent:

UNITED STATES PATENTS

| Number | Name | Date |
|---|---|---|
| 68,961 | Davis | Sept. 17, 1867 |
| 281,086 | Lemon | July 10, 1883 |
| 391,717 | Miller | Oct. 23, 1888 |
| 963,242 | Osterberg | July 5, 1910 |
| 1,830,009 | Watters | Nov. 3, 1931 |

FOREIGN PATENTS

| Number | Country | Date |
|---|---|---|
| 37,324 | France | 1929 |